Oct. 6, 1953   G. A. TINNERMAN   2,654,620
FURNITURE POST END CONSTRUCTION
Filed May 27, 1949

INVENTOR.
GEORGE A. TINNERMAN
BY
H. G. Lombard
ATTORNEY

Patented Oct. 6, 1953

2,654,620

UNITED STATES PATENT OFFICE 2,654,620

FURNITURE POST END CONSTRUCTION

George A. Tinnerman, Cleveland, Ohio, assignor to Tinnerman Products, Inc., Cleveland, Ohio, a corporation of Ohio Application May 27, 1949, Serial No. 95,855

2 Claims. (Cl. 287—20)

This invention relates in general to furniture leg or furniture post end constructions and deals, more particularly, with improvements in the securing of various types of fittings onto the ends of tubular metal furniture legs or furniture posts to provide the same with feet, tips and similar finishing devices in the manufacture of tubular metal furniture, and the like.

A primary object of the invention is to provide an improved securing means for this purpose in the form of a simple sheet metal anchor plate, or the like, which is easily and quickly applied to securing position within the tubular metal post or leg and which is positively locked in such applied position against removal, displacement or relative turning during rotation of an associated bolt or screw to fastened or unfastened relation therewith.

Another object of the invention is to provide a securing means of the kind described which comprises an improved anchor plate construction having a self-locking action in applied position in the tubular metal post or leg and which includes stud or thread engaging means adapted for self-locking engagement with an associated bolt, screw or stud for securing a fitting or other part onto the end of the tubular post or leg to provide the same with a finished end construction that is strong and durable and admirably suited for economical quantity production at relatively low cost.

Further objects and advantages of the invention and other new and useful features in the construction, arrangement and general combination of parts will be readily apparent as the following description proceeds with reference to the accompanying drawings, for purposes of illustration but not of limitation, in which like reference characters designate like parts throughout, and in which.

Figure 1:
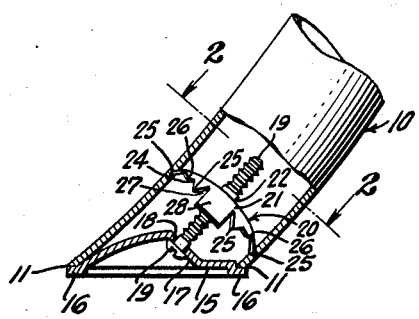
Fig. 1 is a vertical sectional view, partly in elevation, showing a tubular metal furniture leg or post provided with an end or foot structure in accordance with the invention.
Figure 2:
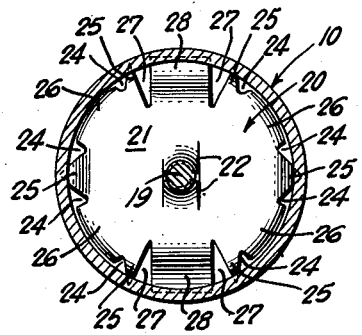
Fig. 2 is a sectional view of Fig. 1 along line 2—2, looking in the direction of the arrows, showing the improved anchor plate of the invention in top plan and the securing action thereof in the tubular metal post or leg.

Referring now, more particularly, to the drawings, Figs. 1 and 2 illustrate a typical end construction of a tubular metal furniture post or leg 10 which extends in generally diagonal relation to the lower portion of the leg of a chair, table or other article of furniture. The open free end of the tubular post or leg 10 is cut on a bevel to the post or leg thus provided such that the peripheral edge 11 thereof extends horizontally. A fitting comprising a generally annular disc 15 is provided in a size corresponding to the said peripheral edge 11 at the end of the tubular post or leg 10. Said disc 15 includes a circumferential flange 16 and is depressed inwardly to provide a central bearing portion 17 which extends at right angles to the axis of the tubular leg or post 10 and is provided with an opening 18 for a bolt or screw 19. The arrangement of the disc 15, accordingly, is such that the circumferential flange 16 thereof seats and supports the peripheral edge 11 at the end of the tubular post or leg 10 while the central bearing portion 17 of said disc supports the head of the bolt or screw 19 in a manner whereby the shank of said bolt or screw is substantially in line with the central axis of the tubular post or leg 11. The bolt or screw 19 is thereby positioned and supported for most effective uniform threaded engagement with a central nut or thread portion on an anchor plate 20 which is locked in applied position within said tubular metal post or leg 10. The fitting 15, when thus secured substantially as shown in Fig. 1, serves as a foot or end trimming which closes the end of the tubular post or leg 10 against the entrance of foreign matter and eliminates any sharp edges thereon which would cut, scratch or otherwise injure any finished surface on which the leg or post end 10 might rest or slide.

The anchor plate 20 is a relatively simple, inexpensive article of manufacture which may be readily produced at very low cost and from any suitable sheet metal material such as heat treated and tempered spring metal or cold rolled metal having spring like characteristics. The anchor plate 20 is readily provided from a simple sheet metal blank which is formed into a generally dished-shaped configuration to comprise a central base or body portion 21 provided with stud engaging means in the form of cooperating tongues 22 or equivalent thread engaging means for threadedly engaging the bolt or screw 19.

The stud engaging elements 22 are best provided from the sheet metal material of the central base or body portion 21 of the anchor plate by an aperture intermediate spaced parallel slits which form cooperating tongues, or the like, having spaced extremities defining the desired thread or thread opening corresponding substantially to the root of the bolt or screw 19 for threadedly engaging the thread thereof. Said tongues otherwise are preferably formed to project outwardly out of the plane of the base or body portion 21 and are bent lengthwise in substantial ogee formation to provide for the maximum strength obtainable to withstand the tightening action of the bolt or screw as it is advanced to final applied fastening position.

Such stud or thread engaging means 22 may be pressed, stamped, extruded, or otherwise provided on the anchor plate 20 in any suitable form or construction for threadedly engaging with the thread of the bolt or screw 19 and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, such stud engaging means prepared in the form of cooperating, resilient tongues as shown, are possessed of unusual strength and will not collapse or pull through when the bolt or screw is tightened, nor loosen under continuous strain and vibration in the installation. This takes place by reason of the fact that the sheet metal material from which such tongues are formed is of less thickness than the pitch or spacing between adjacent thread convolutions of the bolt or screw, wherefore the extremities of said tongues tend, more effectively, to move toward each other and dig into the grooves intermediate adjacent thread convolutions of the bolt or screw when tightened and otherwise become embedded in the root of the bolt in locked, frictional fastening engagement therewith. Thus, in the present example, the tongues 22 are shown as extending out of the plane of the central body or base 21 in substantial ogee formation and provided preferably with arcuately notched extremities, forming substantial biting jaws designed to cut into the root of the bolt and the adjacent thread surfaces thereon in positive self-locking relation therewith in the most effective manner. It is to be understood, however, that the present invention is not limited in any manner or form to the illustrated construction of the thread engaging means 22 but rather, fully contemplates any similar and related forms of such tongues or equivalent stud engaging elements for threadedly engaging a bolt or screw or for engaging a threadless stud such as the shank of a rivet, pin, or the like.

The anchor plate 20 is provided on its periphery with a series of generally V-shaped notches or recesses 24 in combination with similar deeper recesses or notches 27 at substantially diametrically opposite points. These notches or recesses define a series of resilient pointed prongs 25 or pointed cutting or embedding elements spaced by similar land portions 26 of slightly less length than said pointed prongs 25. The extremities of said land portions 26 preferably are provided to conform with the contour of the inner circular wall of the tubular post or leg 10 but in a reduced size so as not to engage said wall in the applied fastening position of the anchor plate as shown in Fig. 2. The resilient prongs 25, however, are longer than said land portions 26 and project materially beyond the outline of said inner wall of the post or leg 10 when the anchor plate is in normal untensioned condition, and accordingly, in the applied final position of the anchor plate, said prongs 25 are adapted to cut and dig into embedded anchored relation in said inner wall at spaced points.

The deeper notches or recesses 27 define a pair of diametrically opposite resilient tabs or strips 28 which are of sufficient length to be bent downwardly to provide spring shoulders or abutments having cutting edges on their extremities adapted to dig into and become embedded in the inner wall of the tubular post or leg 10 in conjunction with the pointed prongs 25, as aforesaid. The resiliency of the pointed prongs 25 and the spring shoulders 28 is controlled by the depth of the notches 24 and 27, respectively, and by varying the depth of these notches, the resiliency of said spring prongs 25 and spring shoulders 28 may be increased or diminished as necessary or desirable. In the present form of the invention, the cutting edges on the extremities of said spring shoulders 28 engage a larger surface of the inner wall of the post or leg 10 than the pointed prongs 25, and said spring shoulders 28, accordingly, are provided with increased resiliency by virute of the deeper notches or recesses 27 defining said tabs 28.

As shown in Fig. 2, the cutting edges on the extremities of the spring shoulders 28 are adapted to engage material surface portions of the inner tubular wall of the post or leg 10 and to embed therein in what may be termed line or edge contact of said cutting edges with said inner tubular wall while the pointed prongs 25 are adapted to be disposed in point contact with said inner tubular wall. Said spring shoulders 28, in thus engaging material surface portions of said inner tubular wall, are adapted to serve as abutments which support and rigidify the anchor plate 20 in final attached position in said tubular post or leg 10. In this relation, the cutting edges on the extremities of said spring shoulders 28 are adapted to embed in said inner wall together with the pointed prongs 25 to lock the anchor plate in such final attached position.

Figure 3:
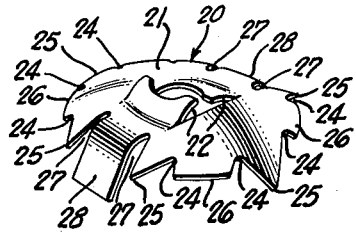
Fig. 3 is a perspective view of the anchor plate shown employed in Figs. 1 and 2; and, Fig. 4 is a side elevational view of the anchor plate shown in Figs. 1–3 inclusive.
Figure 4:
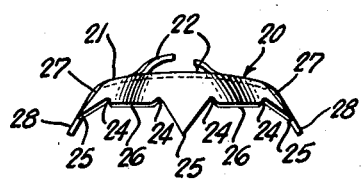

The anchor plate 20 having the foregoing described features of construction is provided in the manner of a generally convex, dish-shaped sheet metal body having the thread engaging means 22 or similar stud engaging elements at the center of the base 21 and the cooperating prongs 25 and spring shoulders 28 extending along the downturned peripheral edge thereof. In the normal untensioned condition of the anchor plate, as shown in Figs. 3 and 4, the pointed ends of said prongs 25 and the cutting edges on the extremities of the spring shoulders 28 project materially beyond the outline of the tubular inner wall of the post or leg 10 and must be compressed radially inwardly to pass within said tubular inner wall.

The anchor plate 20, thus provided, is adapted to be readily assembled within the tubular post or leg 10, as shown in Fig. 1, to a position in which the base or body of said anchor plate extends generally at right angles to the vertical axis of said post or leg 10 at a predetermined location therein. This assembling operation preferably is effected by the use of a suitable tool such as a pushing implement which fits within the concave surface of the anchor plate 20 and engages, more particularly, the central base portion 21 of the anchor plate so that the pointed ends of the prongs 25 and the cutting edges on the extremities of the spring shoulders 28 extend free and unsupported and are thereby adapted to flex radially inwardly as necessary to enter and pass into the tubular inner wall of the post or leg 10. The body of the anchor plate also is adapted to yield somewhat as may be necessary for this purpose, and accordingly, said anchor plate is easily and quickly inserted within the tubular wall of the post or leg 10 with its convex surface foremost and then pushed axially to a predetermined final attached position adjacent the end of said post or leg 10. As the anchor plate 20 is pushed to such final position, the extremities of the land portions 26 slide freely over said inner tubular wall of the post or leg 10 and thereby maintain the anchor plate centered with respect to said tubular inner wall in generally normal relation thereto.

As the anchor plate 20 is thus advanced to its final attached position, the prongs 25 and spring shoulders 28 are flexed radially inwardly by engagement with the tubular inner wall of the post or leg 10. Said prongs 25 and spring shoulders 28 are thereby tensioned in final position and attempt to assume their initial untensioned position in the untensioned condition of the anchor plate. Accordingly, in the final attached position of the anchor plate, Figs. 1 and 2, the tensioned spring shoulders 28 automatically force the cutting edges on the extremities thereof to cut into and become embedded in the inner tubular wall of the post or leg 10 under constant spring tension in what may be termed a self-locking action of the anchor plate in its final applied position. Likewise, the tensioned prongs 25 force the pointed ends thereof into embedded engagement with said inner tubular wall under spring tension in a similar self-locking action to secure the anchor plate 20 in final attached position in cooperation with the embedded cutting edges of the spring shoulders 28, as aforesaid. In this relation, said spring shoulders 28 embed in said tubular inner wall along material surface portions thereof and are thereby adapted to serve as abutments which support and rigidify the anchor plate in final attached position in the tubular post or leg 10.

With the anchor plate 20 thus applied to final attached and locked position within the tubular post or leg 10, said anchor plate provides a firm and rigid base for the stud engaging elements or thread engaging means 22 which thread with the bolt or screw 19 in the attachment of the fitting 15 to complete and finish off the end of the tubular post or leg 10. Inasmuch as the anchor plate 20 in such final attached position is arranged substantially at right angles to the longitudinal central axis of the tubular post or leg 10, the thread engaging elements 22 on the base 21 thereof are thus disposed for the most effective even and uniform threaded engagement with the thread of the bolt or screw 19 as applied lengthwise substantially along the central axis of the tubular post or leg 10. The head of the bolt or screw 19, when tightened, seats firmly and rigidly on the central bearing portion 17 of the disc-like fitting 15, and the threaded shank thereof is secured in self-locking threaded engagement with the spring tongues 22 of the anchor plate 20 under continuously effective spring tension, as aforesaid.

Figure 5:
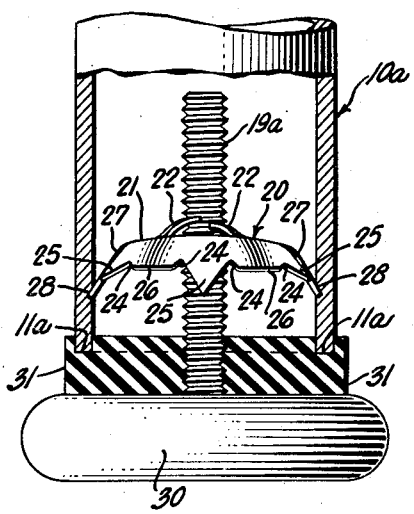
Fig. 5 is a vertical sectional view of the end of another tubular metal furniture post or leg illustrating a further application of the invention.

In a similar manner, the anchor plate 20 may be employed for retaining any other fitting or part in secured relation over the end of a tubular metal post or leg. In Fig. 5, for example, the anchor plate 20 just described is shown as applied in a similar manner to final attached position in a tubular post or leg 10a having the end thereof provided as a simple square-cut peripheral edge 11a. In such an arrangement, any suitable tip or cap may be secured in normal relation to the end of the post or leg 10a by means of a bolt, screw or threaded stud 19a threaded with the thread engaging elements 22 on the anchor plate. In the example shown in Fig. 5, the bolt or screw 19a is shown connected to a standard type of fitting in the form of a cap or tip 30 having a rubber cushion 31 which provides a resilient seat for the square cut peripheral edge 11a at the end of the tubular post or leg 10a. The anchor plate 20 is applied to final attached position in the tubular post or leg 10a as described with reference to Figs. 1–4 inclusive, whereupon the fitting 30 is turned as necessary to thread the bolt 19 into threaded engagement with the nut portion or other thread engaging means 22 to provide the completed construction shown in Fig. 5.

Figure 6:
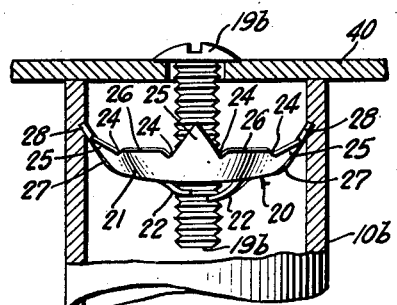
Fig. 6 is a vertical sectional view through the end of a tubular metal post or the like showing another application of the invention.

Fig. 6 discloses a further adaptation of the invention as employed to secure a plate-like part 40 over the end of the tubular post or leg 10b as, for example, in the manner of a member forming a portion of a table top or the seat of a chair. The anchor plate 20 is provided for assembly to final attached position in the tubular post or leg 10b as described with reference to Figs. 1–4 inclusive, and the bolt or screw 19b threaded with the thread engaging elements 22 or other nut portion on the anchor plate 20 in the usual manner to provide the completed construction shown in Fig. 6.

In any adaptation of the invention, it is expedient in some instances to preassemble the anchor plate 20 on the securing bolt, screw, or other stud in connected relation with the fitting or part to be secured to the tubular post or leg 10 and then apply the anchor plate in such an assembly to self-locking attached position in the tubular post or leg 10 to provide the same completed constructions shown in Figs. 1, 5 and 6, respectively.

The anchor plate 20 in any form preferably is constructed of relatively thin sheet metal the thickness of which is selected according to service requirements and the predetermined size of the parts to be secured. The anchor plate 20 is most effective when provided of spring metal suitably spring tempered and otherwise treated to give the desired toughness and hardness, particularly in the case of devices which are subject to constant usage in heavy duty applications. A cheap and highly effective anchor plate may be provided from cold rolled metal such as cold rolled steel which is untempered but of a spring metal nature and capable of providing an effective and reliable securing device, as and for the purposes described.

While the invention has been described in detail with specific examples, such examples are intended as illustrations only inasmuch as various modifications may be resorted to without departing from the spirit and scope of the invention.

What is claimed is:

1. A post construction comprising a post end having an inner tubular wall, an anchor plate in self-locked attachment in said post end comprising a generally convex sheet metal body defining a base and provided with recesses on its periphery defining diametrically opposite resilient shoulders and pointed prongs and land portions between said pointed prongs on the periphery of said anchor plate between said diametrically opposite resilient shoulders, said land portions conforming substantially to the contour of said inner wall but out of contact therewith, said resilient shoulders having cutting edges cutting into said inner tubular wall together with said prongs in locking the anchor plate within said tubular wall, stud engaging means on said base of the anchor plate comprising raised integral thread engaging tongues extending from said base, a complementary part on said post end, and a screw in self-locking threaded engagement with said thread engaging tongues and securing said part on the post end.

2. A post construction comprising a diagonally extending post end having an inner tubular wall and its extremity bevelled to provide a horizontal peripheral edge, an anchor plate in self-locked attachment in said post end comprising a sheet metal body defining a base and provided with recesses on its periphery defining pointed prongs and resilient shoulders and land portions between said pointed prongs, said resilient shoulders having cutting edges cutting into said inner tubular wall together with said prongs in locking the anchor plate within said tubular wall, stud engaging means on said base of the anchor plate, a complementary part on said horizontal peripheral edge of said post end and a stud connected to said stud engaging means and securing said part on the post end.

GEORGE A. TINNERMAN.

References Cited in the file of this patent

UNITED STATES PATENTS

| Number | Name | Date |
| --- | --- | --- |
| 1,083,697 | Nepture | Jan. 6, 1914 |
| 1,750,965 | Osterman | Mar. 18, 1930 |
| 2,133,871 | Reed | Oct. 18, 1938 |
| 2,295,911 | Page | Sept. 15, 1942 |
| 2,435,079 | Hotchkin | Jan. 28, 1948 |
| 2,456,480 | Austin | Dec. 14, 1948 |
| 2,564,635 | Becker | Aug. 14, 1951 |
| 2,618,009 | Tinnerman | Nov. 18, 1952 |
| 2,621,947 | Markvart | Dec. 16, 1952 |

FOREIGN PATENTS

| Number | Country | Date |
| --- | --- | --- |
| 524,194 | France | 1911 |
| 722,633 | France | 1932 |